US007840099B2

(12) United States Patent
Pan et al.

(10) Patent No.: US 7,840,099 B2
(45) Date of Patent: Nov. 23, 2010

(54) ULTRAFAST GE/SI RESONATOR-BASED MODULATORS FOR OPTICAL DATA COMMUNICATIONS IN SILICON PHOTONICS

(75) Inventors: Dong Pan, Andover, MA (US); Jifeng Liu, Cambridge, MA (US); Lionel C. Kimerling, Concord, MA (US); James F. McMillan, New York, NY (US); Michael D. Sockin, New York, NY (US); Chee Wei Wong, New York, NY (US)

(73) Assignee: Massachusetts Institute of Technology, Cambridge, MA (US)

( * ) Notice: Subject to any disclaimer, the term of this patent is extended or adjusted under 35 U.S.C. 154(b) by 127 days.

(21) Appl. No.: 11/624,357

(22) Filed: Jan. 18, 2007

(65) Prior Publication Data

US 2008/0199123 A1    Aug. 21, 2008

Related U.S. Application Data

(60) Provisional application No. 60/759,877, filed on Jan. 18, 2006.

(51) Int. Cl.
*G02F 1/01*    (2006.01)
*G02F 1/295*    (2006.01)

(52) U.S. Cl. .................................... 385/1; 385/4; 385/9
(58) Field of Classification Search .................. 385/1–3
See application file for complete search history.

(56) References Cited

U.S. PATENT DOCUMENTS

| | | | | |
|---|---|---|---|---|
| 6,052,495 | A * | 4/2000 | Little et al. | 385/2 |
| 6,411,752 | B1 * | 6/2002 | Little et al. | 385/17 |
| 6,631,225 | B2 * | 10/2003 | Lee et al. | 385/28 |
| 6,907,152 | B2 * | 6/2005 | Takahashi et al. | 385/15 |
| 7,127,147 | B2 * | 10/2006 | Gunn et al. | 385/130 |
| 2003/0138178 | A1 * | 7/2003 | Kimerling et al. | 385/2 |
| 2004/0008968 | A1 * | 1/2004 | Lee et al. | 385/142 |
| 2007/0116398 | A1 * | 5/2007 | Pan et al. | 385/2 |

FOREIGN PATENT DOCUMENTS

| | | |
|---|---|---|
| WO | 9917151 | 4/1999 |
| WO | 0050938 | 8/2000 |

OTHER PUBLICATIONS

"Finite element analysis of liNbO3 waveguides with Si and Si/SiO2 overlay," by Conese et al, IEEE Journal of Lightwave Technology, vol. 16, No. 6, Jun. 1998, pp. 1113-1122.*

(Continued)

*Primary Examiner*—Charlie Peng
*Assistant Examiner*—Robert Tavlykaev
(74) *Attorney, Agent, or Firm*—Gauthier & Connors LLP

(57) ABSTRACT

An optical modulator structure includes at least two waveguide structures for inputting and outputting an optical signal. At least one ring resonator structure provides coupling between the at least two waveguide structures. The at least one ring resonator structure includes Ge or SiGe.

14 Claims, 4 Drawing Sheets

OTHER PUBLICATIONS

Little, B.E. et al., "Wavelength Switching Routin Using Absorption and Resonance" IEEE Photonics Technology Letters, vol. 10, No. 6, Jun. 1998, pp. 816-818.

Liu, A. et al., "A high-speed silicon optical modulator based on a metal-oxide-semiconductor capacitor" Letters to Nature, vol. 427, Feb. 12, 2004, pp. 615-618.

Xu, Q. et al., "Micrometre-scale silicon electro-optic modulator" Nature Letters, vol. 435, May 19, 2005, pp. 325-327.

Jongthammanurak, S. et al., "Large electro-optic effect in tensile strained Ge-on-Si films" Applied Physics Letters, 8, 2006, pp. 161115-1-161115-3.

Bourdon et al., "Ultralow Loss Ring Resonators Using 3.5% Index-Contrast Ge-Doped Silica Waveguides" IEEE Photonics Technology Letters, vol. 15, No. 5, May 2003, pp. 709-711.

Ridder et al., "Silicon Oxynitride Planar Waveguiding Structures for Application in Optical Communication" IEEE Journal of Selected Topics in Quantum Electronics, vol. 4, No. 6, Nov./Dec. 1998, pp. 930-937.

Lipson et al., "Manipulating Light on Chip" TuMi, 2005 IEEE, Cornell University, Ithaca, NY 14850, pp. 278-279.

* cited by examiner

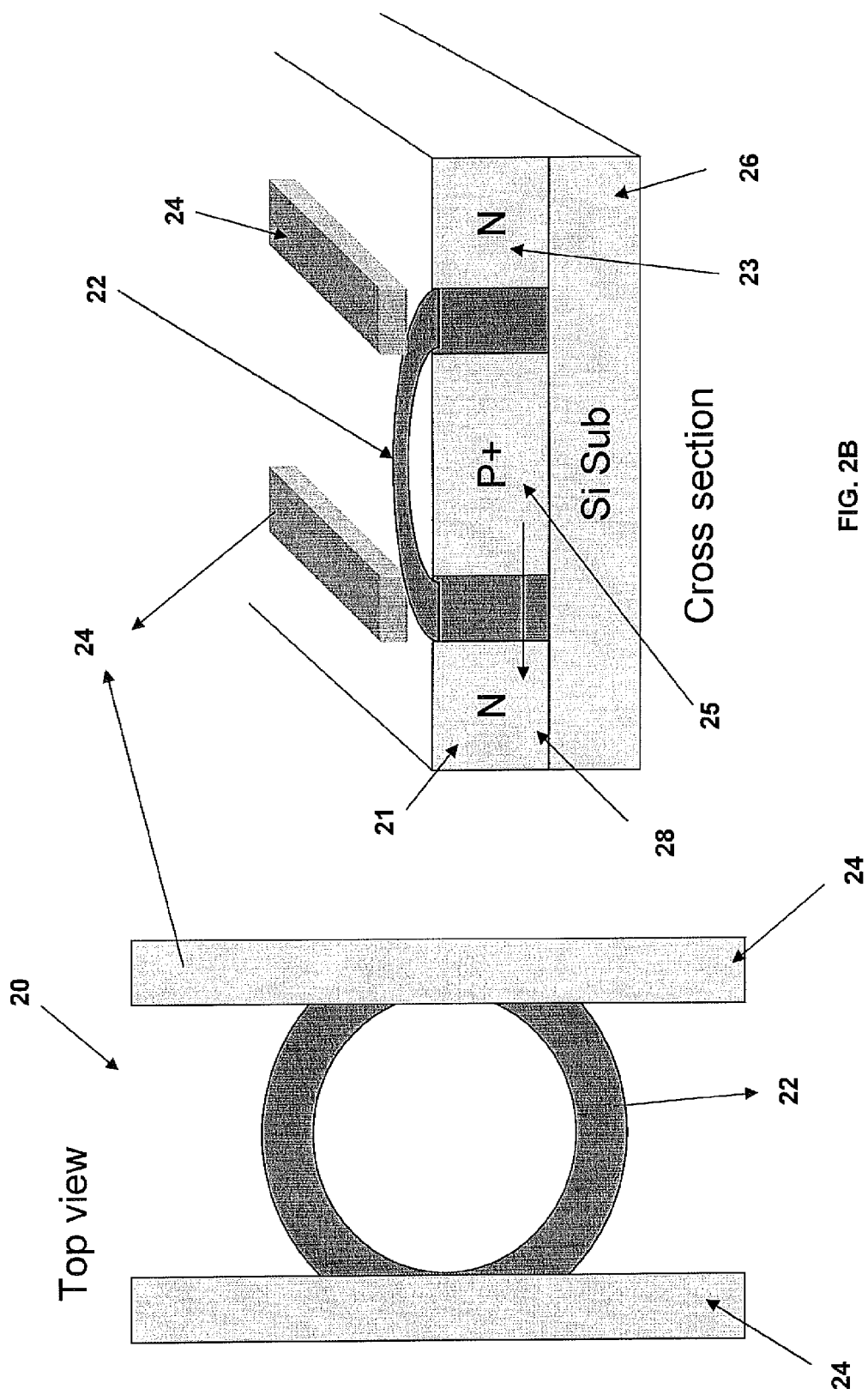

ULTRAFAST GE/SI RESONATOR-BASED MODULATORS FOR OPTICAL DATA COMMUNICATIONS IN SILICON PHOTONICS

PRIORITY INFORMATION

This application claims priority from provisional application Ser. No. 60/759,877 filed Jan. 18, 2006, which is incorporated herein by reference in its entirety.

SPONSORSHIP INFORMATION

This application was made with government support awarded by DARPA under Grant No. HR0011-05-C-0027. The government has certain rights in the invention.

BACKGROUND OF THE INVENTION

The invention is related to the field of ring resonators, and in particular to Ge/Si resonator-based modulators for optical data communications in silicon photonics.

It is highly desired to have a field effect based modulator by using materials compatible with Si-CMOS platform. Ring resonators are gaining more and more interest due to its very small footprint (<a few tens µm), extremely high sensitivity to refractive index change, large extinction ratio and small power consumption. There are several reports on Si based ring modulators, where the refractive index change is induced by free carrier absorption.

It is well known that field effect devices are theoretically able to operate at the highest speed. Epitaxial SiGe on Si has been proposed for modulator devices by using Franz-Keldysh effects. However, there are several challenges needed to be solved in order to achieve workable ring modulator. First, Ge on Si is a high refractive index contrast system and its single mode dimension size is very small. Next, the index difference between Si and Ge is very large and it results in a very small coupling efficiency between Si waveguide and Ge (or SiGe) ring. Furthermore, depending on the operating composition of Si in SiGe, the Q-factor of Ge (or SiGe) ring could be low due to intrinsic absorption, which could result a low extinct ratio.

SUMMARY OF THE INVENTION

According to one aspect of the invention, there is provided an optical modulator structure. The optical modulator structure includes at least two waveguide structures for inputting and outputting an optical signal. At least one ring resonator structure provides coupling between the at least two waveguide structures. The at least one ring resonator structure includes Ge or SiGe.

According to another aspect of the invention, there is provided a method of performing optical modulation. The method includes using at least two waveguide structures for inputting and outputting an optical signal. Also, the method includes providing coupling between the at least two waveguide structures using at least one ring resonator structure, the at least one ring resonator structure comprising Ge or SiGe.

BRIEF DESCRIPTION OF THE DRAWINGS

FIGS. 2A-2B are schematic diagrams illustrating another embodiment of the inventive ring resonator modulator structure;

DETAILED DESCRIPTION OF THE INVENTION

The invention provides a ring resonator modulator structures that utilizes either Ge or SiGe ring resonators. This allows for more compact ring resonator structures that can be used in modulator structures requiring less space and higher performance.

Figures 1A, 1B:
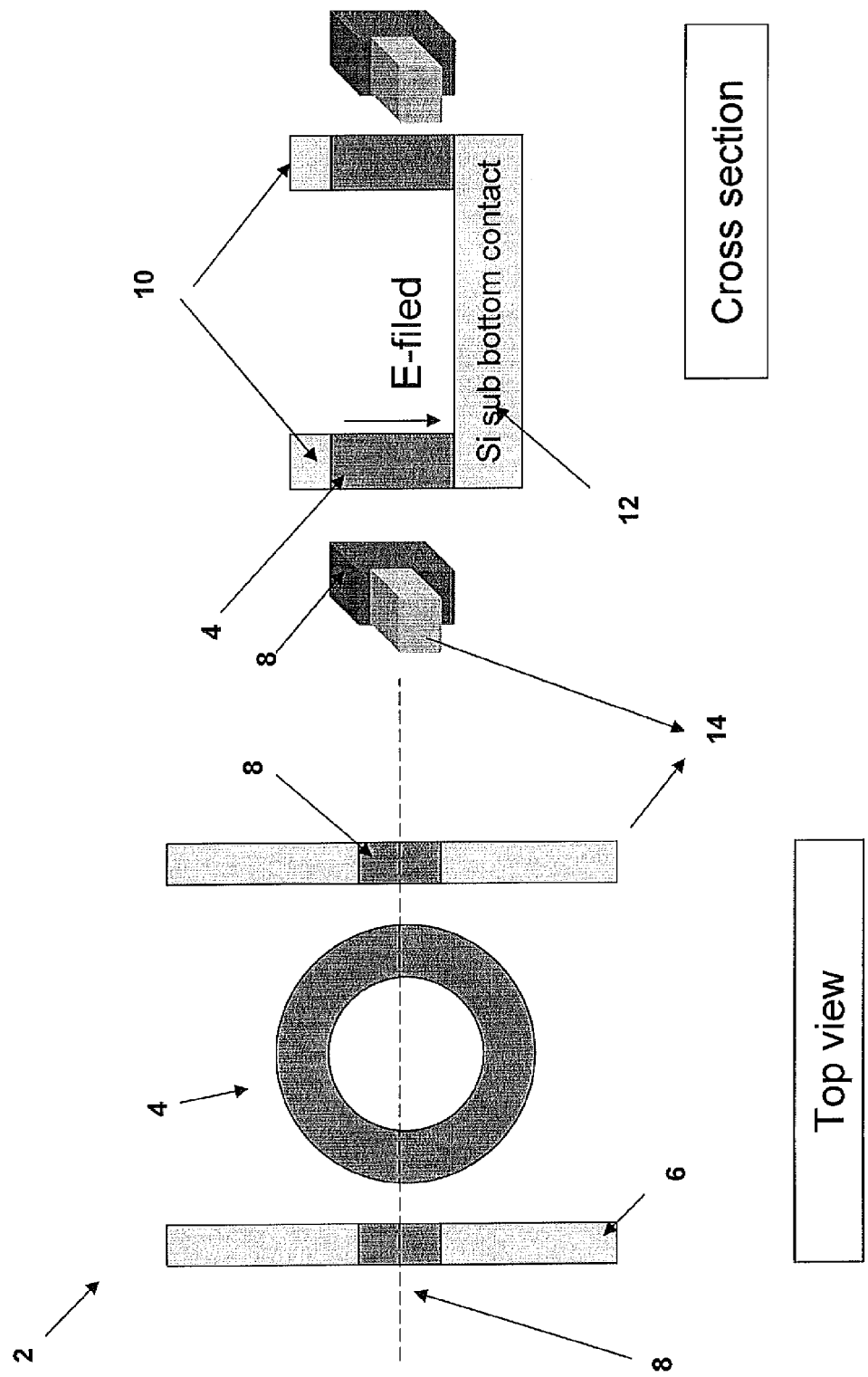
FIGS. 1A-1B are schematic diagrams illustrating the inventive ring resonator modulator structure.

FIGS. 1A-1B show the inventive ring resonator modulator structure 2. In particular, FIG. 1A shows a top view of the ring resonator modulator structure 2 and FIG. 1B shows a cross-section view of the ring resonator modulator structure 2. The ring resonator modulator structure 2 includes a Ge or SiGe ring resonator structure 4. A doped poly-Si layer 10 is formed on top of the ring resonator structure 4 and acts as the top contact. A Si substrate 12 with an opposite doping type acts as the bottom contact to provide the vertical field and RF signal.

Input and output waveguides 6 and 14 are located laterally next to the ring resonator structure 4 to provide lateral coupling between the input and output waveguides 6 and 14 and the ring resonator structure 4. The waveguides 6 and 14 can include Si or SiON waveguide. Short channel waveguides 8 can be inserted into the input and output waveguides 6 and 14 at the area close to ring resonator structure 4 to enhance side coupling. The short channel waveguides 8 can comprise Ge or SiGe. The ring resonator structure 4 and the short channel waveguides 8 can be fabricated by selective growth of Ge or SiGe in a trench. Both TE and TM can be used to couple into and out of the waveguides 6 and 14. A resonator with a Q on the order of 100 that permits ultrafast modulation speeds (resonant photon lifetime on the order of 160 fs) with adequate extinction ratio on the order of 3 to 4 dB.

FIGS. 2A-2B shows another embodiment of the inventive ring resonator modulator structure 20. In particular, FIG. 2A shows a top view of the ring resonator modulator structure 20 and FIG. 2B shows a cross-section view of the ring resonator modulator structure 20. The ring resonator modulator structure 20 includes a Ge or SiGe ring resonator structure 22. The ring resonator structure 22 is formed on a dopant layer comprising two n-type regions and a p-type region formed between the n-type regions. The dopant layer 28 is formed on a Si substrate 26.

Input and output waveguides 24 are located laterally on the edge to the ring resonator structure 22 to provide lateral coupling between the input and output waveguides 24 and the ring resonator structure 22. The waveguides 24 can include Si or SiON waveguide. Both TE and TM can be used to couple into and out of the waveguides 24. A resonator with a Q on the order of 100 that permits ultrafast modulation speeds (resonant photon lifetime on the order of 160 fs) with adequate extinction ratio on the order of 3 to 4 dB.

Figure 3:
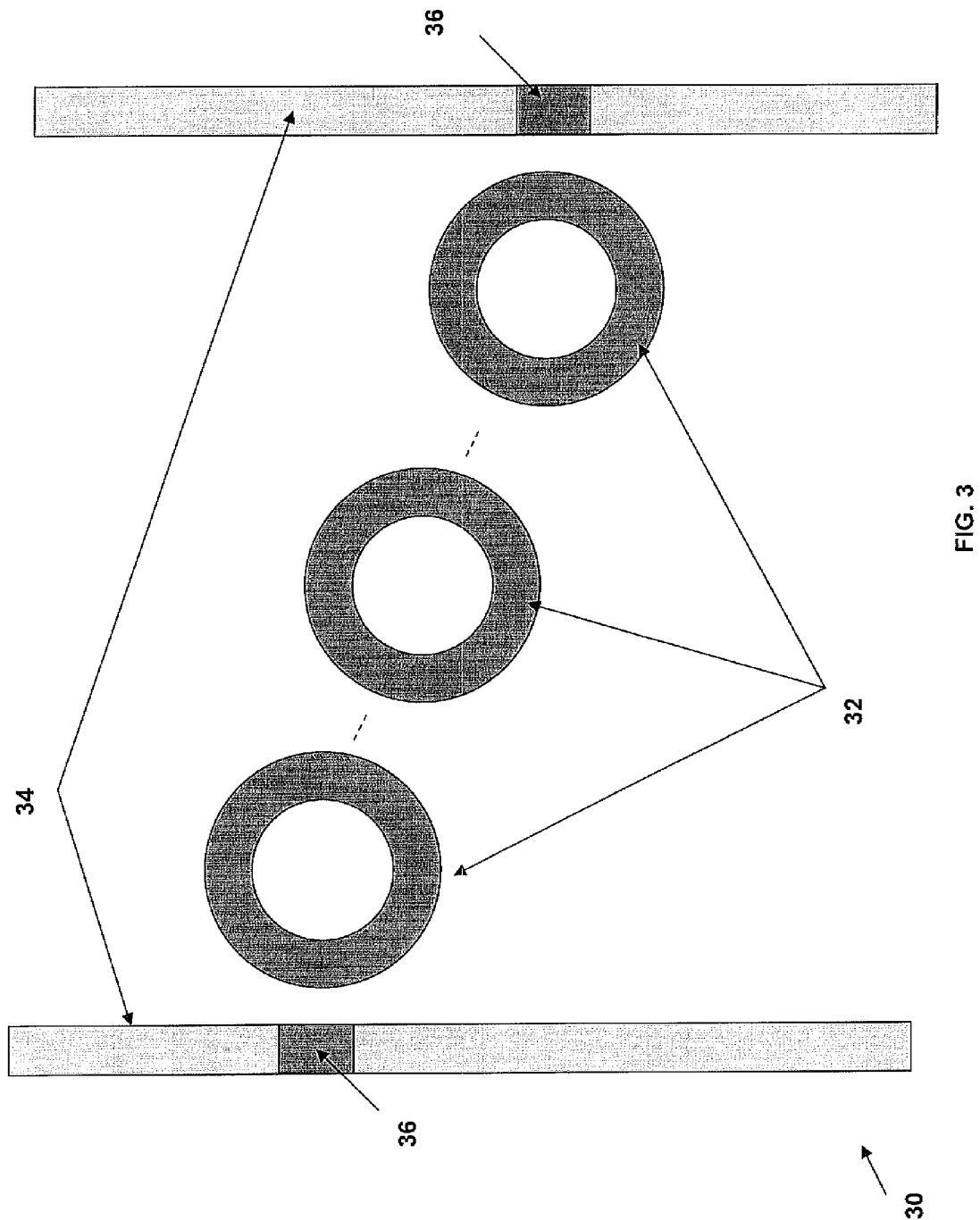
FIG. 3 is a schematic diagram illustrating an embodiment of a ring resonator modulator structure having multiple ring resonators.

FIG. 3 show an embodiment of a ring resonator modulator structure 30 having multiple ring resonators 32. The ring resonator modulator structure 30 is similar to the ring resonator modulator structure 2 discussed for FIG. 1, except the ring resonator modulator structure 30 includes multiple ring resonator structures 32. Input and output waveguides 34 are located laterally next to the ring resonator structures 32 to provide lateral coupling between the input and output waveguides 34 and the ring resonator structures 32.

The waveguides 34 can include Si or SiON waveguides. A short channel waveguides 36 can be inserted into the input and output waveguides 34 at the area close to ring resonator structures 32 to enhance side coupling. The short channel waveguides 36 can comprise Ge or SiGe. The ring resonator structures 32 and the short channel waveguides 36 can be fabricated by selective growth of Ge or SiGe in a trench. Both TE and TM can be used to couple into and out of the waveguides 34. A resonator with a Q on the order of 100 that permits ultrafast modulation speeds (resonant photon lifetime on the order of 160 fs) with adequate extinction ratio on the order of 3 to 4 dB.

Figure 4B:
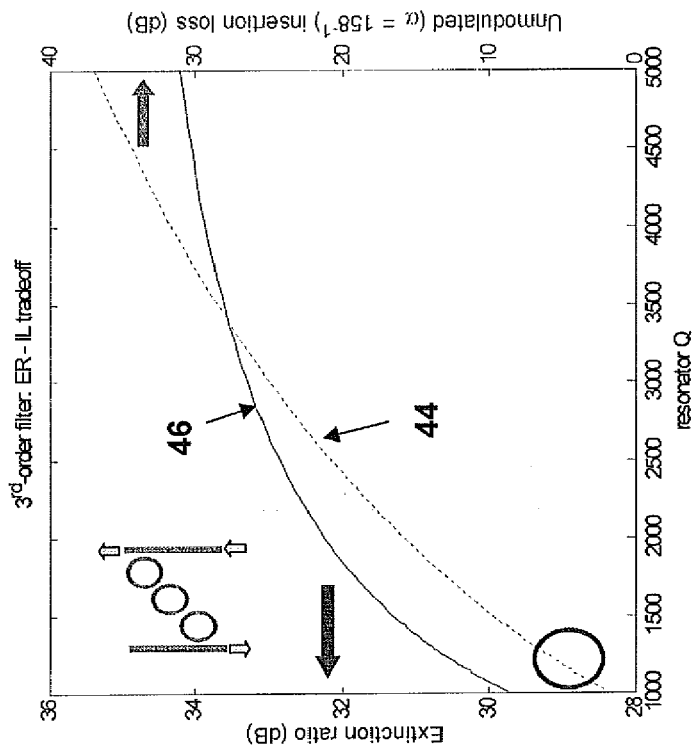
FIGS. 4A-4B are graphs demonstrating the overall performance of the invention.
Figure 4A:
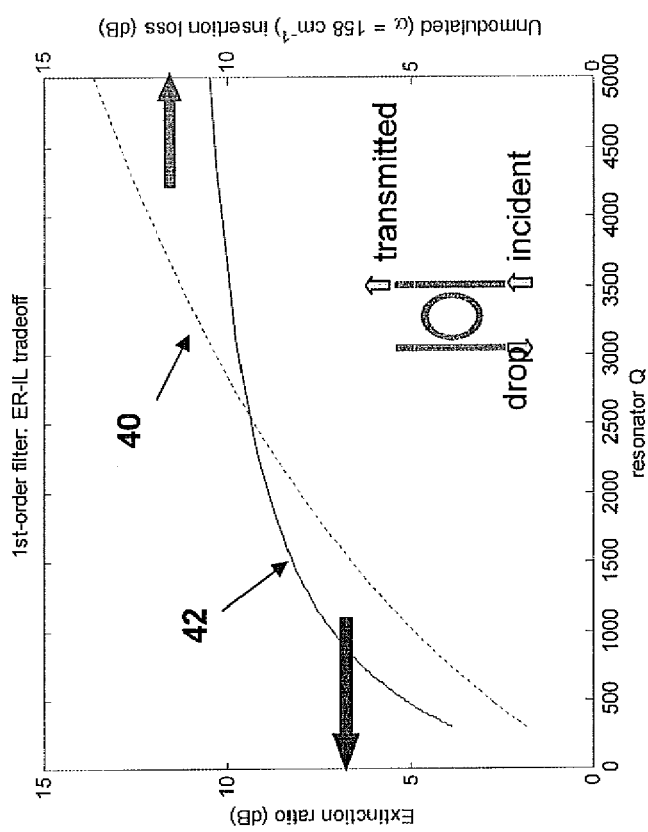

FIGS. 4A-4B are graphs demonstrating the overall performance of the invention. FIG. 4A shows actual and theoretical results associated with the relationship between the extinction ratio, Q value, and insertion loss of a single ring resonator modulator structure. Graph 40 illustrates the theoretical results of Si ring resonator structure and graph 42 show actual results of Ge ring resonator structure used in accordance with the invention. There is significant lower insertion loss in graph 42 as compared to graph 40. FIG. 4B shows actual and theoretical results associated with the relationship between the extinction ratio, Q value, and insertion loss of a multiple ring resonator modulator structure having multiple Si ring resonator structures, shown in graph 44, and multiple Ge ring resonator structures, shown in graph 46. The multiple Ge ring resonator structures show lower insertion loss as compared to the multiple Si ring resonator structures for the same range of extinction ratios. Thus, this proves the performance is increased using the structures described herein.

Inclusion of a larger ring radius modulator increases the extinction ratio, although the insertion loss also increases (though not linearly proportional). Insertion loss includes of two components: loss from non-unity (less than 100%) coupling into the microring, and loss from material absorption. A larger ring proportionally increases the extinction ratio given the increased interaction length; a larger ring increases the material absorption insertion loss but does not affect the non-unity coupling insertion loss. An improvement of the extinction ratio divided by insertion loss can thus be expected with a larger ring radius high-speed intensity modulator.

Inclusion of higher-order filters will also increase the extinction ratio with a likewise expense of increasing insertion loss. Racetrack resonators further improve the ring-waveguide coupling, resulting in a larger extinction ratio for a given insertion loss in the modulator.

Absorption and refractive index change of Ge or SiGe material under electric field has been modeled based on Franz-Keldysh effect, and has been experimentally confirmed. Full first-principles numerical simulations of a Ge/Si ring intensity modulator have confirmed the physical operation of the device and have been used to design the device for optimum performance. These full 3D Finite Difference Time Domain (FDTD) simulations have been used to identify the waveguide design parameters that will make the best modulator, based on realistic achievable Ge/Si material absorption values. Numerical simulations have also been used to determine the best polarization that works for several device geometries.

Various modulator geometries have been simulated to extract the insertion loss and the extinction ratio. The current design results illustrate an insertion loss of 4.31 dB and an extinction ratio of 3.31 dB. These values are for a geometry that consists of a microring modulator with a 5 µm diameter and a 0.15 µm ring-waveguide gap.

A resonator having a Q in the order of 100 corresponds to photon lifetimes of 160 fs (1.5 THz). The RC limited bandwidth of the device is well above 40GHz. The device operates at a low voltage of <3.3V and the power consumption is in the order of a few mW, compared to several W of $LiNbO_3$ or $BaTiO_3$ modulators currently used in telecommunications.

Also, the designed intensity modulator discussed here is directly compatible with the process flow of a germanium detector, permitting full optical channelizers in a monolithic silicon CMOS compatible chipset. The process flow to create this high-speed modulator is immediately compatible with CMOS process line foundries. The modulator is compact (in the order of 10× wavelengths or less in physical size), permitting high-density integration of photonic and electronic drivers and circuits on an identical materials platform.

Although the present invention has been shown and described with respect to several preferred embodiments thereof, various changes, omissions and additions to the form and detail thereof, may be made therein, without departing from the spirit and scope of the invention.

The invention claimed is:

1. An optical modulator structure comprising:
   at least two waveguide structures for inputting and outputting an optical signal; and
   at least one ring resonator structure that provides coupling between said at least two waveguide structures, said at least one ring resonator structure comprising Ge or SiGe, wherein
   one or more segments of Ge or SiGe channel waveguide structures are inserted into said at least two waveguide structures only at an area within an evanescent optical field of said at least one ring resonator structure to enhance coupling between said at least two waveguide structures and said at least one ring resonator structure, wherein
   said at least two waveguide structures are located laterally next to said at least one ring resonator structure and wherein said at least one ring resonator structure and said least two waveguide structures produce a finesse factor (Q) of at least 100.

2. The optical modulator of claim 1, wherein said at least two waveguide structures comprise Si.

3. The optical modulator of claim 1, wherein said at least two waveguide structures comprise SiON.

4. The optical modulator of claim 1, wherein said at least one ring resonator structure provides side coupling.

5. The optical modulator of claim 1, wherein said at least one ring resonator structure provides vertical coupling.

6. The optical modulator of claim 1, wherein said at least one ring resonator structure is formed on a Si substrate.

7. The modulator of claim 1, wherein said at least one ring resonator structure is formed on a layer comprising n-type and p-type materials and said layer is formed on a Si substrate.

8. A method of performing optical modulation comprising:
   utilizing at least two waveguide structures for inputting and outputting an optical signal; and
   providing coupling between said at least two waveguide structures using at least one ring resonator structure, said at least one ring resonator structure comprising Ge or SiGe, wherein
   one or more segments of Ge or SiGe channel waveguides structures are inserted into said at least two waveguide structures only at an area within an evanescent optical field of said at least one ring resonator structure to enhance coupling between said at least two waveguide structures and said at least one ring resonator structure, wherein
   said at least two waveguide structures are located laterally next to said at least one ring resonator structure and wherein said at least one ring resonator structure and said least two waveguide structures produce a finesse factor (Q) of at least 100.

9. The method of claim 8, wherein said at least two waveguide structures comprise Si.

10. The method of claim 8, wherein said at least two waveguide structures comprise SiON.

11. The method of claim 8, wherein said at least one ring resonator structure provides side coupling.

12. The method of claim 8, wherein said at least one ring resonator structure provides vertical coupling.

13. The method of claim 8, wherein said at least one ring resonator structure is formed on a Si substrate.

14. The method of claim 8, wherein said at least one ring resonator structure is formed on a layer comprising n-type and p-type materials and said layer is formed on a Si substrate.

* * * * *